United States Patent [19]
Ushiyama

[11] 4,241,339
[45] Dec. 23, 1980

[54] MULTI-COLORED DISPLAY DEVICE
[75] Inventor: Yoshito Ushiyama, Suwa, Japan
[73] Assignee: Kabushiki Kaisha Suwa Seikosha, Tokyo, Japan
[21] Appl. No.: 878,548
[22] Filed: Feb. 16, 1978
[30] Foreign Application Priority Data
  Feb. 16, 1977 [JP] Japan .................... 52/15906
[51] Int. Cl.³ ........................................ G09F 9/35
[52] U.S. Cl. ............................ 340/702; 340/784; 350/331 R; 350/335; 350/349
[58] Field of Search ............. 340/324 R, 324 M, 702, 340/784, 378 R; 350/331, 332, 333, 335, 345, 349, 356

[56] References Cited
U.S. PATENT DOCUMENTS

| | | | |
|---|---|---|---|
| 3,569,614 | 3/1971 | Hanlon | 350/331 |
| 3,897,137 | 7/1975 | Dobbins | 350/335 |
| 3,967,881 | 7/1976 | Moriyama et al. | 350/349 |
| 4,097,130 | 6/1978 | Cole | 350/335 |

OTHER PUBLICATIONS
Kobayashi and Takeuchi; Multicolor Field-Effect Display Devices with Twisted Nematic Liquid Crystals; undated, 2 pp.
T. J. Scheffer; Liquid Crystal Color Displays, Brown Boveri Symposium on Nonemissive Electro Optic Displays; Sep. 29-30, 1975, 34 pp.

*Primary Examiner*—David L. Trafton
*Attorney, Agent, or Firm*—Blum, Kaplan, Friedman, Silberman & Beran

[57] ABSTRACT

Multi-colored display devices comprising layered liquid crystal display cells are provided. The multi-colored display devices include a first polarizing plate, a first liquid crystal display cell of the twisted nematic type having an optical activity of about 90° disposed adjacent to the polarizing plate and at least one liquid crystal display cell of the guest-host type containing a dye disposed adjacent to the first display cell. In the guest-host display cell the liquid crystal and dyes are oriented parallel to the polarizing axis of the polarizing plate. The multi-colored display device includes an auxiliary color source which may be a colored polarizing plate disposed on the surface of the device opposed to the first polarizing plate with the axis of polarization of the colored polarizing plate perpendicular to the axis of polarization of the first polarizing plate or an additional liquid crystal cell of the guest-host type including a different dye.

9 Claims, 11 Drawing Figures

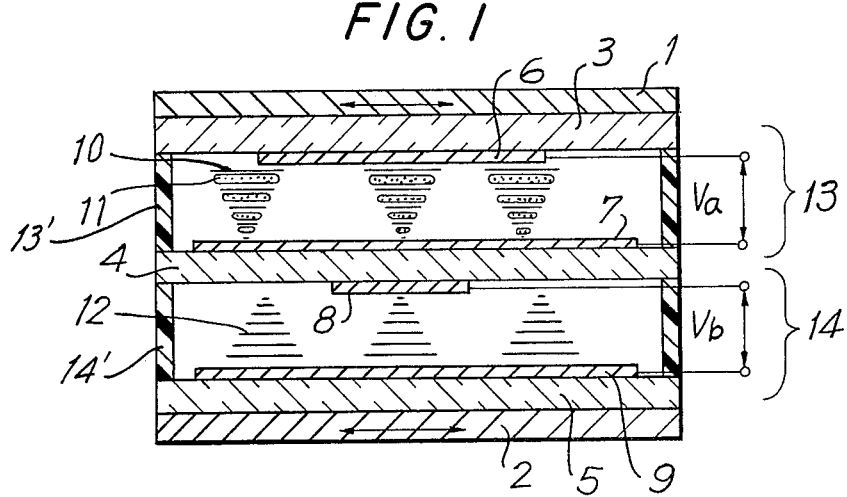
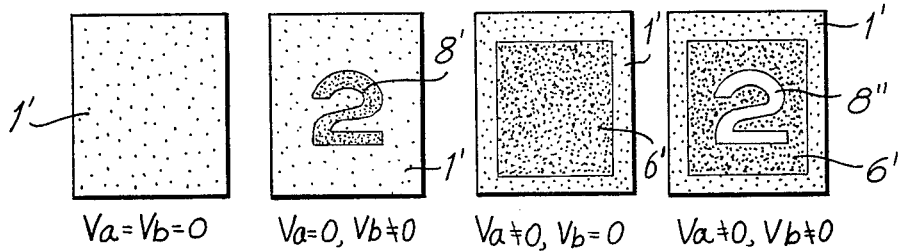
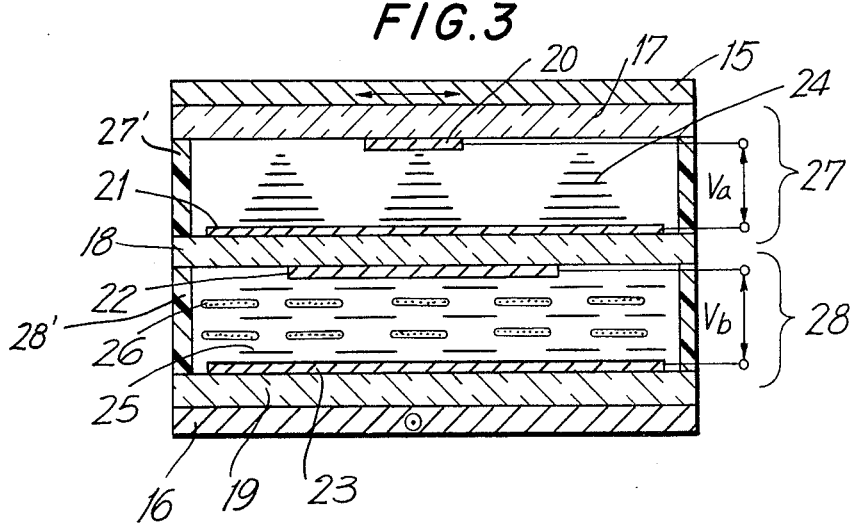

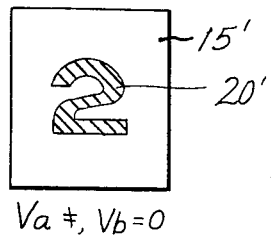
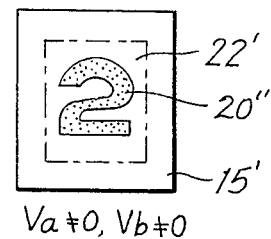
FIG.4a  $V_a \neq, V_b = 0$
FIG.4b  $V_a \neq 0, V_b \neq 0$
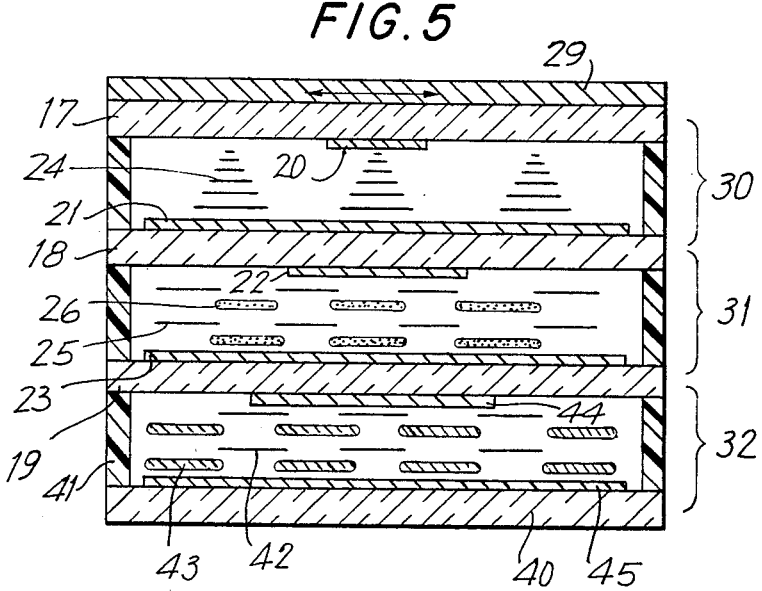
FIG.5
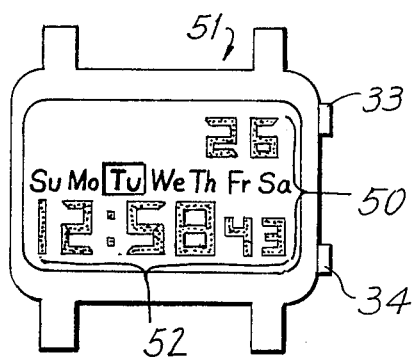
FIG.6
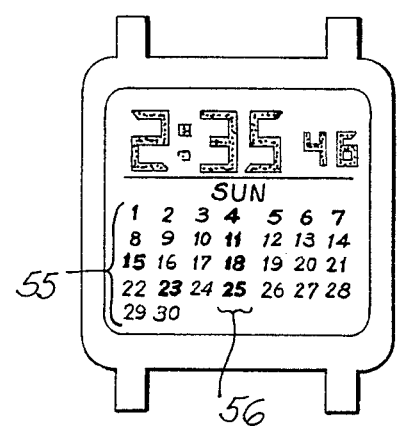
FIG.7

MULTI-COLORED DISPLAY DEVICE

BACKGROUND OF THE INVENTION

This invention relates generally to an improved multi-colored display device, and in particular to an improved multi-colored display device including at least two layered liquid crystal display cells.

Conventional means for providing a colored display in a conventional liquid crystal display device includes employing the DAP effect wherein two polarizing plates and a liquid crystal material of the homeotropic type are used. The vertical orientation of the liquid crystal material is altered as the voltage impressed across the cell is changed and the color is produced by the birefringence of the liquid crystal due to change in the orientation of the liquid crystal material. In a guest-host (GH) type liquid crystal display dyes are included in the liquid crystal material and a color is produced due to the dye property of absorbing light having a certain wavelength. In a liquid crystal display cell of the twisted nematic (TN) type, colored polarizing plates are employed.

It is difficult to provide a desirable colored display by using the DAP effect since the color variation is large due to its dependency on thickness of the liquid crystal layer, the voltage dependency is high and the color varies with differing angles of observation. In addition, display cells based on the GH effect or the TN type liquid crystal with colored polarizing plates provides colored displays limited to a single color. In addition, in these systems the display is not distinctly shown due to low contrast ratio. Accordingly, it is desirable to provide a colored liquid crystal display device of sufficient contrast and offering more than a single color combination.

SUMMARY OF THE INVENTION

Generally speaking, in accordance with the invention, a multi-colored display device including at least two overlapping liquid crystal display cells is provided. A multi-colored display device constructed and arranged in accordance with the invention includes n superimposed display cells denominated from the upper portion of the device as the first display cell, the second cell ... and the nth display cell. A first polarizing plate is disposed on the upper surface of the first display cell. The first display cell is a liquid crystal display cell of the twisted nematic type having an optical activity of about 90° and the liquid crystal material in the second to the nth display cells is of the guest-hose type, each cell including a different dye. In the guest-host cells the liquid crystal and dye are oriented parallel to the polarizing axis of the first polarizing plate. An auxiliary color source is provided on the lower surface of the nth display cell. In one embodiment of the invention a three colored display is provided by a display device including two display cells and the auxiliary color source is a colored polarizing plate having its axis of polarization perpendicular to the first polarizing plate. In another embodiment for providing a three colored display, the auxiliary color source is an additional guest-host liquid crystal display cell including a dye of a different color than included in the second display cell.

Accordingly, it is an object of the invention to provide an improved colored display device.

Another object of the invention is to provide an improved multi-colored display device including at least two superimposed liquid crystal display cells.

A further object of the invention is to provide an improved multi-colored display device including at least two superimposed liquid crystal display cells capable of providing a display of more than two colors.

Still another object of the invention is to provide an improved colored display device including a twisted nematic liquid crystal display cell and a guest-host liquid crystal display cell.

Another object of the invention is to provide an improved multi-colored display device providing distinct colored displays.

Still another object of the invention is to provide an improved display device for providing a display pattern of more than three colors.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a cross-sectional view of a conventional two layered colored display device;

FIGS. 2a–2d are plan views of display patterns which may be generated by the display device illustrated in FIG. 1;

FIG. 3 is a cross-sectional view of a two layered multi-colored display device constructed and arranged in accordance with the invention;

FIGS. 4a and 4b are plan view of the multi-colored displays which may be generated by the display device illustrated in FIG. 3;

FIG. 5 is a cross-sectional view of a three layered multi-colored display device constructed and arranged in accordance with another embodiment of the invention;

FIG. 6 is a plan view of a watch face and display including a display device constructed and arranged in accordance with the invention; and FIG. 7 is a plan view of another watch face and display including a display device constructed and arranged in accordance with the invention.

DESCRIPTION OF THE PREFERRED EMBODIMENTS

A conventional method for providing a colored display device is shown in cross-section in FIG. 1 and the display variations are shown in FIGS. 2a–2d. Referring specifically to FIG. 1, a display device including a first liquid crystal display cell 13 of the GH type and a second display cell 14 of the TN type are superimposed with a first polarizing plate 1 disposed on first display cell 13 and a second polarizing plate 2 is disposed on the lower surface of second display cell 14. The display device of FIG. 1 provides color display by means of its three operating states. The first state is when an incident light almost penetrates the display device. The second state wherein an incident light does not penetrate the display device. In the third state dyes contained in first display cell 13 of the GH type absorb light of a certain wavelength for producing the colored display. In a display device constructed and arranged in accordance with the showing in FIG. 1, only a one color display may be presented.

In FIG. 1, first and second polarizing plates 1 and 2 each has its polarizing axis parallel to the plane of the drawing as indicated by the arrows. First display cell 13 is formed with an upper transparent glass plate 3, a lower transparent glass plate 4 and a spacer 13' for defining a space between glass plates 3 and 4. A thin film transparent electrode 6 is disposed along the interior surface of upper glass plate 3 and a thin film transparent electrode 7 is disposed along the upper surface of glass plate 4 in first display cell 13. In second display cell 14, glass plate 4 is the upper plate of the display cell and a lower transparent plate 5 is provided with a spacer 14' for defining a space between glass plates 4 and 5.

In display cells 13 and 14 the interior surfaces of the glass plates are rubbed in a single direction for orienting liquid crystals 10 and 11 disposed therebetween. In the display device shown, a P-type liquid crystal 10 including a dye 11 is disposed in first display cell 13 between glass plates 3 and 4. Thus, first display cell 13 utilizes the GH effect. A P-type liquid crystal material 12 is disposed between plates 4 and 5 and second display cell 14 thereby second display cell 14 utilizes the TN effect.

Liquid crystal molecules 10 adjacent to glass plate 3 in first display cell 13 are oriented parallel with the plane of the drawing and adjacent to glass plate 4 are perpendicular to the plane of the drawing providing first display cell 13 with an optical activity of about 90°. In first display cell 13, dye molecules 11 are also set in the array of liquid crystal molecules 10. In this configuration the direction of the elongated axis of liquid crystal molecules 10 coincide with that of dye molecules 11. In this manner dye 11 appears to be colored by absorbing light having a certain wavelength of the incident light parallel to the long axis of dye molecule 11. Incident light perpendicular to the direction of the long axis of dye molecule 11 penetrates through without any absorption of light.

Liquid crystal material 12 in second display cell 14 also has an optical activity of about 90° with liquid crystal molecules 12 adjacent to glass plate 4 oriented perpendicularly to the plane of the drawing and liquid crystal molecules 12 adjacent to the upper surface of glass plate 5 oriented in parallel with the plane of the drawing. In the display device of FIG. 1, transparent electrode 6 disposed on the interior surface of glass plate 3 is formed larger than transparent electrode 8 formed on the lower surface of glass plate 4. The operation of the display device of FIG. 1 will be described in detail with respect to the displays illustrated in FIG. 2.

FIGS. 2a–2d illustrate the display when voltages are selectively impressed across first display cell 13 and second display cell 14. FIG. 2a illustrated a display 1' which occurs when no voltage $V_a$ is impressed across first display cell 13 and no voltage $V_b$ is impressed across second display cell 14. FIG. 2b illustrates a display 8' of the numeral 2 when a predetermined voltage $V_b$ is impressed across second display cell 14 with voltage $V_a$ across first display cell 13 remaining 0. FIG. 2c illustrates the display when a voltage $V_a$ is impressed across first display cell 13 with voltage $V_b$ across second display cell 14 remaining at 0. FIG. 2d illustrates the display when a predetermined voltage is impressed across both first display cell 13 and second display cell 14.

In the case of the display illustrated in FIG. 2a, incident light striking the display device at polarizing plate 1 is transmitted through first polarizing plate 1 in the form of straight polarized light parallel to the polarizing axis which coincides with the direction of dye molecules 11 in first display cell 13 adjacent to glass plate 3. As the direction of the light transmitted through first polarizing plate 1 coincides with the direction of the polarizing axis of second polarizing plate 2, light penetrates through first display cell 13 and second display cell 14 and the display device acquires the color of dye molecules 11.

Referring now to FIG. 2b, when a voltage $V_b$ is impressed across second display cell 14, liquid crystal 10 between electrode 8 and a portion of electrode 9 becomes oriented perpendicularly to electrodes 8 and 9 and loses the optical activity. Thus, light having penetrated through first display cell 13 in the portion corresponding to electrode 8 perpendicularly intersects the polarizing axis of second polarizing plate 2 which prevents light from penetrating and this portion acquires a black color 8'.

Referring specifically to FIG. 2c, a voltage $V_a$ is applied across first display cell 13 and the voltage $V_d$ across second display cell 14 remains zero. In this case liquid crystal molecules 10 disposed between electrodes 6 and the opposed portion of electrode 7 lose their optical activity. Light having penetrated through first polarizing plate 1 perpendicularly intersects the polarizing axis of second polarizing plate 2 so that the portion of the display corresponding to electrode 6 acquires a black color 6'.

In the display illustrated in FIG. 2d, wherein a first voltage $V_a$ is applied across first display cell 13 and a second voltage $V_b$ is applied across second display cell 14, liquid crystal molecules disposed between electrode 6 and the opposed portion of electrode 7 in first display cell 13 and liquid crystal molecules 12 disposed between electrode 8 and the opposed portion of electrode 9 in second display cell 14 lose their optical activity. As the polarizing axis of both first polarizing plate 1 and second polarizing plate 2 coincide in the direction parallel to the plane of the figure, all the incident light penetrates through the display device in the region corresponding to electrode 8 in both display cells 13 and 14 and the display portion corresponding to electrode 8 becomes bright, that is to say this portion acquires a white color 8''. In this display configuration, any absorption of light does not occur since all dye molecules 11 are also aligned perpendicularly to the opposed plates of first display cell 13 together with all liquid crystal molecules 10 disposed between electrode 6 and the opposed portion of electrode 7.

In this display device, if transparent electrodes 6 and 8 are formed in the same configuration, the black display illustrated in FIGS. 2b and 2c and the white display illustrated in FIG. 2d can be obtained by the display device. However, the displayed portion is merely indicated with a white tone or a black color with the background indicated in any desired color. Since the displayed portion cannot be presented in the color of dye molecule 11, a display device constructed and arranged in accordance with FIG. 1 cannot truely be said to be a colored display device. Moreover, as two display cells are superimposed, the black and white portions overlap when the display device is observed from an oblique direction. This overlapping also occurs when opposed electrodes have not been positioned properly during the manufacturing process. In these latter cases, the aesthetic appeal of the display device is lowered considerably.

A display device constructed and arranged in accordance with the invention eliminates the above-noted effects. Specifically, the invention offers a display device which provides a colored indicia in the display in more than three different colors and a white background. A detailed description of the improved display device constructed and arranged in accordance with the invention is as follows.

Referring specifically to FIG. 3 the display device includes a first liquid crystal display cell 27 and a second liquid crystal display cell 28. First display cell 27 includes an upper transparent glass plate 17 and a lower transparent glass plate 18. Glass plate 18 also forms the upper transparent plate of second display cell 28 which includes a lower transparent glass plate 19. First display cell 27 includes a spacer 27' for defining a space between glass plates 17 and 18 and second display cell 28 includes a spacer 28' for defining a space between glass plates 18 and 19. As shown in FIG. 3 the display device includes a first polarizing plate 15 having a polarizing axis parallel to the plane of the drawing as indicated by the arrow disposed across the upper portion of glass plate 17. A colored polarizing plate 16 is disposed across the lower surface of plate 19 of second display cell 28. Colored polarizing plate 16 has a polarizing axis perpendicular to the plane of the drawing as illustrated. The parallel portion of incident light approaching the display device from the side of first polarizing plate 15 penetrates first polarizing plate 15. Most incident light perpendicular thereto is absorbed by first polarizing plate 15. Thus, all of the incident light penetrating first polarizing plate 15 is straight polarized light parallel to the polarizing axis of first polarizing plate 15. Light parallel to the polarizing axis of colored polarizing plate 16 penetrates through colored polarizing plate 16 and light perpendicular to the polarizing axis thereof having a certain wavelength is absorbed so that colored polarizing plate 16 appears to be colored. The display device includes in first display cell 27 a transparent electrode 20 disposed along the inner surface of glass plate 17 and a transparent electrode 21 disposed along the upper portion of common glass plate 18. A transparent electrode 22 is disposed along the lower surface of common glass plate 18 and an opposed transparent electrode 23 is disposed along the upper portion of lower glass plate 19 of second display cell 28.

A P-type liquid crystal 24 is disposed in the space between glass plates 17 and 18 in first display cell 27 for forming a TN type liquid crystal display cell. A P-type liquid crystal 25 and a dye 26 is disposed in the space between glass plates 18 and 19 of second display cell 28 for forming a GH type liquid crystal display cell. Liquid crystal molecules 24 adjacent to the interior surface of glass plate 17 in first display cell 27 are oriented perpendicularly to the plane of the drawing and those adjacent to glass plate 18 oriented parallel to the plane of the drawing thereby providing first display cell 27 with an optical activity of about 90°. This orientation may be obtained by rubbing the interior surface of plate 17 and plate 18 in a single direction and positioning the plates with the direction of rubbing at about 90°. All of liquid crystal molecules 25 and dye molecules 26 in second display cell 28 are oriented in parallel with the plane of the drawing. It is important that first polarizing plate 15 is disposed on the side of the display cell employing the TN effect (in this case first display cell 27) and that colored polarizing plate 16 is disposed on the opposed side of the display cell employing the GH effect (in this case second display cell 28). Further, liquid crystal molecules 25 and dye molecules 26 in second display cell 28 of the GH type are oriented in parallel with the polarizing axis of first polarizing plate 15.

When a voltage is impressed across neither display cell 27 and 28, incident light approaching the display device from the side of first polarizing plate 15 is transformed into straight polarized light by passing through first polarizing plate 15. The plane of vibration of the straight polarized light is rotated 90° after penetrating through first display cell 27. All of the light having penetrated through first display cell 27 penetrates through second display cell 28 without any absorption as the plane of vibration of the light is perpendicular to the orientation direction of liquid crystal molecules 25 and dye molecules 26. Most of the incident light also penetrates through colored polarizing plate 16 without being absorbed as the plane of vibration of the light having penetrated through first display cell 27 and second display cell 28 coincides with the direction of the polarizing axis of colored polarizing plate 16 and the display device appears white in color.

Referring now to FIG. 4a, the display when voltage $V_a$ is impressed across first display cell 27 and voltage $V_b$ across second display cell remains zero is shown. In this case liquid crystal molecules 24 in first display cell 27 disposed between electrode 20 and the opposed portion of electrode 21 is perpendicularly oriented and loses its optical activity. The plane of vibration direction of the straight polarized light penetrating through first polarizing plate 15 coincides with the orientation direction of liquid crystal molecules 25 in second display cell 28. Dye molecules 26 absorb a portion of the light having penetrated a certain wavelength. The light penetrating through second display cell 28 perpendicularly intersects the polarizing axis of colored polarizing plate 16 wherein light of a certain wavelength is absorbed. Thus, as both dye molecules 26 and colored polarizing plate 16 each absorbs a portion of the penetrating light of a certain wavelength, the display pattern appears to be colored. For example, if dye 26 is a black color dye in second display cell 28, an indicia 20' corresponding to the configuration of electrode 20 acquires a black color. If dye 26 is a blue color dye and colored polarizing plate 16 is red, indicia 20' acquires a purple color. In both of these examples background 15' remains white.

Referring now to FIG. 4b, the display when voltages $V_a$ and $V_b$ are impressed across both first display cell 27 and second display cell 28 is shown. In this field-on state, liquid crystal molecules 24 disposed between electrode 20 and the opposed portion of electrode 21 in first display cell 27 are oriented perpendicularly to opposed glass plates 17 and 18 such that the optical activity is lost. Liquid crystal molecules 25 and dye molecules 26 in the portion of second display cell 28 between electrode 22 and the opposed portion of electrode 23 also are arranged perpendicular to opposed plates 18 and 19 so that incident light is not absorbed by dye molecules 26. Therefore, a portion of the light having penetrated first display cell 27 and second display cell 28 of a certain wavelength is absorbed by colored polarizing plate 16. The color of an indicia 20'' appears colored as determined by colored polarizing plate 16. For example, if colored polarizing plate 16 is red, indicia 20" appears red. In the display device illustrated in FIG. 3 electrode 22 disposed along the lower surface of common plate 18 is larger than electrode 20, so that indicia 20" can be displayed clearly in the desired color even if the positions of both electrodes are shifted during manufacturing or if the display device is observed diagonally.

When electrode 22 is formed larger than electrode 20 liquid crystal molecules 25 disposed between electrode 22 and the opposed portion of electrode 25 are aligned parallel to the electric field therebetween and incident light is transmitted therethrough. Therefore, the displayed color corresponding to this region 22' defined by electrode 22 except for indicia 20" appears white as will the portion of the display in the vicinity where no electrode is provided and there is no difference in the display color between the regions 22' and 15'. Accordingly, the above-noted undesirable characteristics of the conventional colored display device do not occur in the display device of the invention. In addition, in a display device constructed in accordance with the invention, the shape of the desired indicia pattern is determined by the shape of electrode 20 and by first display cell 27 utilizing the TN effect. The color is determined by a combination of second display cell 28 utilizing the GH effect and colored polarizing plate 16 disposed on the lower portion of the display device. Inasmuch as the shape of the display indicia is not determined by the shape of the transparent electrodes in the second display cell the shape of electrode 22 need only be large enough to overlap electrode 20 in plan view.

As noted above, if it is desired to display the indicia in black, black dye molecules 26 are used. However, dye 26 may be a complementary color of colored polarizing plate 16 or a color approaching black in the case of a combination of dye molecules 26 and colored polarizing plate 16. By following this approach, a brighter display pattern can be generated.

As shown in FIG. 3, first display cell 27 is a TN liquid crystal display cell having an optical activity of 90° with liquid crystal molecules 24 adjacent to the lower surface of glass plate 17 oriented perpendicular to the plane of the drawing. However, this orientation is not critical and first display cell 27 may be shifted 90° so that liquid crystal molecules 24 adjacent to glass plate 17 are parallel to the plane of the drawing and liquid crystal molecules 24 adjacent to plate 18 are oriented perpendicularly to the plane of the drawing. Furthermore, in accordance with this embodiment both display cells 27 and 28 are illustrated with a common glass plate 18. It is also within the scope of the invention to provide each display cell with distinct glass plates and then superimpose the display cells. Moreover, because the display indicia is provided by a twisted nematic type liquid crystal display cell which provides good contrast, distinct displays are obtained. Therefore, it is possible to obtain these distinct colored displays with good contrast when the display device is constructed and arranged in accordance with this embodiment of the invention.

Referring now to FIG. 5, a further embodiment of a multi-colored display device constructed and arranged in accordance with another embodiment of the invention is shown. The display device includes a polarizing plate 29, a first display cell 30 of the TN type, a second display cell 31 and a third display cell 32 of the GH type. In contrast to the display device illustrated in FIG. 3 wherein one of the display colors is provided by colored polarizing plate 16, in this embodiment of the invention third display cell 32 is disposed below second display cell 31 in place of colored polarizing plate 16. Polarizing plate 29 has an axis of polarization parallel with the plane of the drawing and is disposed across the upper surface of first display cell 30. The structure of the display device including the axis of polarization of polarizing plate 29 and the orientation direction of and type of liquid crystal molecules in first display cell 30 and second display cell 31 correspond with the description of the embodiment illustrated in FIG. 3. Therefore, like elements are identified by like reference numerals and will not be described in detail.

Third display cell 32 is defined by upper glass plate 19 which is the lower glass plate of second display cell 31 and a lower transparent glass plate 40 and a spacer 41 between glass plates 19 and 40. A transparent electrode 44 is disposed on a portion of the lower surface of glass plate 19 and a transparent electrode 45 is disposed on the upper surface of glass plate 40. A liquid crystal 42 of the GH type is disposed in third display cell 32 and a dye 43 is included and oriented in the same direction as liquid crystal material 42 parallel to the axis of polarization of polarizing plate 29. Operation of the display device illustrated in FIG. 5 is also the same as described with respect to the embodiment of FIG. 3. In accordance with the embodiment of FIG. 5, it is possible to provide a colored display of three colors by utilizing the combination of impressing voltages to second display cell 31 and third display cell 32. For example, if dye 26 in second display cell 31 is blue and dye 43 in third display cell 32 is red, three colores, namely blue, red, and purple may be displayed.

The invention has been described in the embodiments of FIGS. 3 and 5 wherein the display devices include two or three distinct display cells which are overlapped. If more than two display cells utilizing the GH effect are superimposed and different dyes are provided in each display cell, unlimited types of colored displays are possible by imposing voltages across various combinations of the individual display cells. In addition, a colored polarizing plate may be disposed across the lower surface of the lowest display cell.

The invention has been described with respect to all incident light striking the display device from the side of the first polarizing plate. Even if light approaches from the opposite side of the display device, the operation and effects provided by the display cells remain the same. Further, the above described embodiments have been provided with respect to a permeation type display device, however, it is clear that the invention may also be utilized for a reflection type display device by disposing a reflector on one side of the display device. Examples of utilizing the displays which may be provided in accordance with the invention are as follows.

Referring specifically to FIG. 6, a display device 50 constructed and arranged in accordance with the invention is shown in a wristwatch 51. In an electronic timepiece, many operating buttons to control the display cannot be provided and time is corrected by the use of only two operating buttons. As shown in FIG. 6, a time display 52 on display device 50 is corrected by an operating button 34. When performing this operation it is beneficial to show distinctly the digits in time display 52 to be corrected. Thus, if time digits 52 are to be corrected they may be displayed in a different color by impressing a voltage across a selected display cell of the multi-colored display device when button 34 is operated thereby distinguishing time display 52 from the remainder of display 50.

In another embodiment, a display device constructed and arranged in accordance with the invention can also be used to display the varying functions provided in an electronic timepiece. Often wristwatches are provided with additional functions other than a time display, for example the wristwatch may function as a stop watch, a calculator, an alarm and the like. As these functions are displayed by the same indicia as the time display digits which changeover in accordance with the changeover of the functions it is necessary to show distinctly which function is being displayed. If a display device constructed in accordance with the invention is utilized in such a wristwatch, the function being performed may be shown clearly in a different color, the display thereby providing a significant advantage to the user.

In conventional timepieces including many functions, discrimination between functions is often performed by displaying a small mark and the determination of what is being displayed is left to the user's judgment. Thus, such a multi-function conventional timepiece is very inconvenient for a user. In order to overcome this inconvenience caused by the display in a timepiece providing a stop watch function, for example, the time which is usually displayed may be shown in black and the stop watch display may be displayed in blue. Thus, the multi-function electronic wristwatch including a stop watch function becomes very convenient to use by including a display device constructed and arranged in accordance with the invention.

By including a display device constructed and arranged in accordance with the invention in an electronic timepiece additional advantages may also be obtainable. For example, when a battery in an electronic device becomes discharged the need for a battery change may be noted by providing a red display. In another case the display for a certain date such as one's birthday or a date may be changed to blue and when a predetermined time occurs the color of the time display may be changed to red. In addition, the colored time display may be changed optionally to a color which is pleasing to the user. In addition, the color of the time display may be changed according to the time, such as one color in the morning and another color in the afternoon. In an electronic timepiece including a calendar 55, the calendar may be displayed for one full month as illustrated in FIG. 7. The dates of holidays such as Sundays 56 and public holidays may be displayed in red. Moreover, the display device constructed and arranged in accordance with the invention is not limited to use in electronic timepieces and may be used in electronic calculators, testers and the like. When a displayed value in these devices is negative, or exceeds a predetermined value, a display such as red may be provided.

As noted above, a display device constructed and arranged in accordance with the invention includes a plurality of superimposed liquid crystal display cells, the first display cell utilizing a TN liquid crystal wherein the liquid crystal is oriented so that the display device has an optical activity of 90°, the subsequent display cells from the second to the nth are liquid crystal display cells utilizing the GH effect including appropriate dyes with the liquid crystal molecules and dye molecules oriented in a direction parallel to the axis of polarization of the polarizing plate disposed on the upper surface of the first display cell. If desired an appropriate second colored polarizing plate may be disposed on the lower surface of the nth display cell. In both cases good contrast and distinct displays are obtained. Moreover, the multi-colored display device enables the user to alter the color of the pattern to a desirable color. These advantages are not obtainable with multi-layer devices constructed other than in accordance with the invention wherein such devices merely provide a white background and a colored pattern which cannot be changed as may be changed in the display device constructed in accordance with the invention. Display devices constructed and arranged in accordance with the invention are extremely useful for small electronic devices, such as electronic timepieces, electronic calculators and the like.

It will thus be seen that the objects set forth above, among those made apparent from the preceding description, are efficiently obtained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention in which, as a matter of language, might be said to fall therebetween.

What is claimed is:

1. A multi-colored display device comprising an array of N liquid crystal display cells arranged sequentially along a line of sight from an observer, said display cells having transparent electrodes deposited on the interior surfaces of opposed transparent plates, the first of said display cells towards the observer including a twisted nematic liquid crystal having an optical activity of 90° and a first polarizing plate disposed on the surface of said first display cell, each of the N-1 remaining display cells including a guest-host liquid crystal and a dye, each said guest-host liquid crystal oriented in parallel with the axis of polarization of said first polarizing plate and a colored polarizing plate having an axis of polarization perpendicular to the axis of polarization of said first polarizing plate disposed on the exposed surface of the last display cell of said array.

2. The display device of claim 1, wherein said electrodes are segmented.

3. The display device of claim 1, wherein a transparent plate between two adjacent display cell layers of said device is common to each said adjacent display cell layers.

4. The display device of claim 1, wherein each said display cell includes complete digits thereon.

5. The display device of claim 4, wherein one of said electrodes in each said first and second cells is formed to provide a display indicia, said indicia electrode in said second display cell formed larger than said indicia electrodes of said first cell.

6. The display device of claim 5, wherein said color means is an $n+1$ guest-host liquid crystal display cell including a dye.

7. The display device of claim 1, wherein each guest-host display cell includes a different color dye.

8. A multi-colored display device comprising at least three liquid crystal display cells arranged sequentially along a line of sight from an observer, said display cells having transparent electrodes deposited on the interior surfaces of opposed transparent plates, the first said display cells towards the observer including a twisted nematic liquid crystal having an optical activity of 90°, a first polarizing plate disposed on the outer surface of said first display cell and each of the at least two remaining display cell including a guest-host liquid crystal and a dye, each said guest-host liquid crystal oriented in parallel with the axis of polarization of said first polarizing plate, the dye in each guest-host liquid crystal display cell being a different color.

9. The multi-colored display device of claim 8, further including a colored polarizing plate having an axis of polarization perpendicular to the axis of polarization of said first polarizing plate disposed on the exposed surface of the last display cell of said array.

* * * * *